United States Patent
Goto et al.

(10) Patent No.: US 7,981,834 B2
(45) Date of Patent: Jul. 19, 2011

(54) ADSORBENT FOR HYDROCARBONS, CATALYST FOR EXHAUST GAS PURIFICATION AND METHOD FOR EXHAUST GAS PURIFICATION

(75) Inventors: Hideki Goto, Himeji (JP); Akihisa Okumura, Himeji (JP)

(73) Assignees: ICT Co., Ltd., Chuo-Ku, Osaka-Shi (JP); International Catalyst Technology, Inc., Auburn Hills, MI (US)

( * ) Notice: Subject to any disclaimer, the term of this patent is extended or adjusted under 35 U.S.C. 154(b) by 40 days.

(21) Appl. No.: 11/685,432

(22) Filed: Mar. 13, 2007

(65) Prior Publication Data
US 2007/0219082 A1   Sep. 20, 2007

(30) Foreign Application Priority Data
Mar. 16, 2006 (JP) ................. 2006-073145

(51) Int. Cl.
*B01J 20/00* (2006.01)
*B01J 21/00* (2006.01)
*B01J 23/00* (2006.01)
*B01J 23/08* (2006.01)
*B01J 23/10* (2006.01)

(52) U.S. Cl. ........ 502/407; 502/400; 502/414; 502/262; 502/350; 502/304; 502/355; 502/349; 423/700

(58) Field of Classification Search .......... 423/700–718; 502/407, 414, 400, 262, 350, 304, 355, 349
See application file for complete search history.

(56) References Cited

U.S. PATENT DOCUMENTS

| | | | | |
|---|---|---|---|---|
| 5,407,880 A | * | 4/1995 | Ikeda et al. | 502/67 |
| 6,093,378 A | * | 7/2000 | Deeba et al. | 423/213.5 |
| 2002/0198098 A1 | | 12/2002 | Yamamoto et al. | |
| 2003/0099583 A1 | | 5/2003 | Ikeda et al. | |

FOREIGN PATENT DOCUMENTS

| | | |
|---|---|---|
| CN | 1366467 A | 8/2002 |
| EP | 0 645 185 A1 | 3/1995 |
| EP | 0 766 994 A1 | 4/1997 |
| JP | 2-056247 A | 2/1990 |
| JP | 6-198164 A | 7/1994 |
| JP | 7-096177 A | 4/1995 |
| JP | 7-241471 A | 9/1995 |
| JP | 2004-008940 A | 1/2004 |

OTHER PUBLICATIONS

Office Action issued Oct. 16, 2009 by the People's Republic of China Patent Office in Chinese Patent Application No. 2007100875361 and English language translation thereof.
European Search Report dated Oct. 22, 2007.
European Office Action dated Oct. 29, 2007.

* cited by examiner

*Primary Examiner* — David M. Brunsman
*Assistant Examiner* — Kevin M Johnson
(74) *Attorney, Agent, or Firm* — Buchanan Ingersoll & Rooney PC

(57) ABSTRACT

An object of the present invention is to improve hydrocarbon adsorbing property when zeolite is used as an adsorbent for hydrocarbons. The present invention provides an adsorbent for hydrocarbons characterized by comprising A Type of β-zeolite having a $SiO_2/Al_2O_3$ ratio (molar ratio) in a range of 10 or more and less than 200 and B Type of β-zeolite having a $SiO_2/Al_2O_3$ ratio (molar ratio) in a range from 200 to 1,000, and a catalyst for exhaust gas purification containing said adsorbent for hydrocarbons.

24 Claims, No Drawings

US 7,981,834 B2

ADSORBENT FOR HYDROCARBONS, CATALYST FOR EXHAUST GAS PURIFICATION AND METHOD FOR EXHAUST GAS PURIFICATION

BACKGROUND OF THE INVENTION

1. Field of the Invention

The present invention is a technology relating to exhaust gas treatment, specifically a technology relating to removal of hydrocarbon in exhaust gas.

The present invention can be used for treatment of industrial exhaust gas and treatment of exhaust gas from internal combustion engine.

2. Description of the Related Art

In the initiation of operation of an internal combustion, it is difficult to sufficiently treat exhaust gas using a usual catalyst for exhaust gas treatment because temperature of exhaust gas is low. To solve such a problem, an adsorbent for hydrocarbons (hereinafter, sometimes referred to as "HC") using zeolite, which utilizes adsorbing property for hydrocarbons, has been used. Furthermore, a technology has been disclosed, which can be used as a catalyst for exhaust gas by combining an adsorbent for hydrocarbons and a catalyst for exhaust gas purification.

Regarding HC adsorption capacity of zeolite, a number of studies have been done and it has been shown that such types of zeolite as ZSM5 type, USY type, mordenite type, β type, and the like are preferable (see, for example, JP-A-7-241471). Also, JP-A-7-96177 discloses a technology to improve HC adsorption capacity of zeolite, by applying acid treatment to unmodified zeolite to obtain a heat-resistant zeolite followed by applying steam treatment thereto. Further, it has been indicated that aforementioned zeolite can be used as a catalyst for exhaust gas treatment by adding a catalytically active component thereto, and also it has been shown that zeolite and catalyst are each made laminar to exert individual effect separately in order to improve HC adsorption effect thereof (see, for example, JP-A-2004-8940 and JP-A-2-56247).

However, conventional types of zeolite have a room to be improved in view of thermal stability (durability) and HC adsorption capacity. In particular, such types of zeolite are poor in hydrothermal stability, and have a problem of durability when they are used in exhaust gas from engine as an adsorbent.

In addition, even those having superior durability, they sometimes cause problems in handling property or coating property when zeolite slurry is prepared, and an improvement has been demanded from the viewpoint of production efficiency.

Thus, an object of the present invention is to improve hydrocarbon-adsorbing property of zeolite when the zeolite is used as an adsorbent for hydrocarbons, and also to improve durability of the adsorbent.

In addition, another object of the present invention is to provide a zeolite superior in handling property in preparing slurry thereof.

SUMMARY OF THE INVENTION

The present invention relates to an adsorbent for hydrocarbons, characterized by including β-zeolite having a $SiO_2/Al_2O_3$ ratio (molar ratio) in a range of 10 or more and less than 200 (hereinafter, referred to as "A type") and β-zeolite having a $SiO_2/Al_2O_3$ ratio (molar ratio) in a range from 200 to 1,000 (hereinafter, referred to as "B type").

Also, the present invention relates to a catalyst for exhaust gas purification, characterized by comprising of making the above-described A type and B type to be present on a refractory three-dimensional structure (hereinafter, referred to as "lower adsorbent layer") and further a catalytically active component for exhaust gas purification to be present on the lower adsorbent layer (hereinafter, referred to as "upper catalyst layer").

Further, the present invention relates to a catalyst for exhaust gas purification, characterized by comprising of making a catalytically active component for exhaust gas purification to be present on a refractory three-dimensional structure (hereinafter, referred to as "lower catalyst layer") and further the A type and B type to be present on the lower catalyst layer (hereinafter, referred to as "upper adsorbent layer").

The present invention also relates to an exhaust gas purification system and a method for exhaust gas purification, characterized by installing the above-described catalyst for exhaust gas purification in exhaust gas.

The adsorbent according to the present invention provides such effects that hydrocarbon-adsorbing property is superior and reduction rate of specific surface (SA) is less.

The catalyst for exhaust gas purification according to the present invention can purify exhaust gas efficiently due to superior durability thereof.

The above and other objects, features and advantages of the present invention will become clear from the following description of the preferred embodiments.

DESCRIPTION OF THE PREFERRED EMBODIMENT(S)

(Adsorbent for Hydrocarbons)

First aspect of the present invention relates to an adsorbent for hydrocarbons including at least two types of β-zeolite having specific $SiO_2/Al_2O_3$ ratios (molar ratio, hereinafter referred to as "SAR").

Usually, in order to increase HC adsorbed amount, a zeolite having a small SAR even poor thermal stability is preferably used. However, the zeolite having a small SAR lowers the upper limit of solid content in preparing zeolite slurry due to hydrophilic property thereof, resulting in lowered handling property and coating property, which lead to increase in the number of steps in catalyst preparation. According to the present invention, this effect can be reduced by combining a zeolite having a large SAR. Namely, by combining a zeolite having a small SAR and a zeolite having a large SAR, the catalyst can be prepared more easily than before.

In addition, the zeolite having a large SAR is superior in thermal stability but poor a little in HC adsorption capacity. In the present invention, an adsorbent for hydrocarbons which is well-balanced in both of HC adsorption capacity and thermal stability can be obtained by combining a zeolite having a large SAR and a zeolite having a small SAR.

The zeolite according to the first aspect is β-zeolite. As for zeolite itself, various types of zeolite are commercially available. Zeolite includes, for example, natural zeolite and synthetic zeolite, and ZSM5 type, which is a synthetic zeolite, is typically used. In the present invention, β-zeolite is selected because it has superior thermal stability compared with other types of zeolite and also it can adsorb various sizes of hydrocarbons. As the β type of zeolite to be used in the first aspect, commercially available one can be used, and various SAR types of zeolite can be procured depending on applications thereof.

The β-zeolite to be used in the first aspect includes those having a $SiO_2/Al_2O_3$ ratio (molar ratio) in a range of 10 or more and less than 200 (A Type) and those having a $SiO_2/Al_2O_3$ ratio (molar ratio) in a range from 200 to 1,000 (B Type). In the case when SAR is less than 10, the zeolite can hardly be practically used because of poor hydrothermal stabilities. Contrary, when SAR is over 1,000, HC adsorption capacity becomes poor.

SAR of the A Type is preferably 10 to 100, and more preferably 20 to 50.

Amount of the A Type to be used is usually 10 to 350 g/liter, and preferably 100 to 250 g/liter per volume of adsorbent. When the amount is less than 10 g/liter, an effect as a HC adsorbent is insufficient due to poor absolute amount to be adsorbed. On the contrary, when the amount is over 350 g/liter, an adsorption effect corresponding to the addition amount cannot be obtained.

SAR of the B Type is preferably 200 to 800, and more preferably 300 to 700. Amount of the B Type to be used is usually 50 to 350 g/liter, and preferably 100 to 250 g/liter per volume of adsorbent. When the amount is less than 50 g/liter, an effect as a HC adsorbent is insufficient due to poor absolute amount to be adsorbed. On the contrary, when the amount is over 350 g/liter, an adsorption effect corresponding to the addition amount cannot be obtained.

In addition, particle size of the A Type and the B Type are not particularly limited, but usually in a range from 0.1 to 5 μm.

Mass ratio of the A Type and the B Type (A:B) contained in the adsorbent for hydrocarbons is preferably 1:10 to 10:1, and more preferably 1:3 to 3:1. The mass ratio of the A Type and the B Type in such a range is preferable because both of adsorption capacity and thermal stability are improved.

The A Type and the B Type may be appropriately used either in a mixed state or in a separate state, but preferably used in a mixed state.

In addition, both of the A Type and the B Type can be used by mixing with metal oxides other than zeolite. Sufficient heat capacity can be obtained by mixing with other metal oxides. Further, adhesion to a three dimensional structure can be improved when supported on the three dimensional structure. The other metal oxides include alumina, silica, zirconia, titania, ceria, and complex oxides thereof. The above other metal oxides are usually powdery, and particle size of the above other metal oxides is preferably 1 to 10 μm, and more preferably 1 to 3 μm.

Mass ratio of total mass of the A Type and the B Type to the above other metal oxide [(A+B):metal oxide] is preferably 40:1 to 4:1, and more preferably 20:1 to 5:1.

In addition, mass ratio of the A Type to other metal oxide [A:metal oxide] is preferably 20:1 to 2:1, and more preferably 10:1 to 5:2.

Further, mass ratio of the B Type to other metal oxide [B:metal oxide] is preferably 20:1 to 2:1, and more preferably 10:1 to 5:2.

In using as the adsorbent for hydrocarbons according to the first aspect, the A Type, the B Type and optionally other metal oxide can be used by mixing and molding these components, but can be used preferably by being supported on a refractory three-dimensional structure such as honeycomb, metal honeycomb, plug honeycomb and metal mesh.

Amount of the A Type to be used is generally 10 to 350 g/liter, and more preferably 100 to 250 g/liter per 1 liter of three-dimensional structure. When the amount is less than 10 g/liter, an effect as a HC adsorbent is insufficient due to poor absolute amount to be adsorbed. On the contrary, when the amount is over 350 g/liter, an adsorption effect corresponding to the addition amount cannot be obtained.

Amount of the B Type to be used is generally 50 to 350 g/liter, and more preferably 100 to 250 g/liter per volume of the adsorbent. When the amount is less than 50 g/liter, an effect as a HC adsorbent is insufficient due to poor absolute amount to be adsorbed. On the contrary, when the amount is over 350 g/liter, an adsorption effect corresponding to the addition amount cannot be obtained.

Amounts of the A Type and the B Type to be used (total amount) are preferably 30 to 400 g, and more preferably 100 to 250 g per 1 liter of the three-dimensional structure. The amount to be used in such a range is preferable because catalytic activities at initial and after endurance are superior.

Also, amount of other metal oxide to be used is preferably 5 to 50 g, and more preferably 10 to 40 g per 1 liter of the three-dimensional structure.

As for preferable configuration of the honeycomb, generally opening is 300 to 600 cells per 1 square inch of cross-section and thickness of rib is 3 to 6 mm, and in the case of plug honeycomb, opening is 300 to 400 cells per 1 square inch of cross-section and pore diameter of rib is 10 to 30 μm.

As for method for preparing the adsorbent for hydrocarbons, usual means can be used. For example, the adsorbent for hydrocarbons can be obtained by mixing the A Type, the B Type and optionally other metal oxide in an aqueous medium to prepare a slurry, further putting a refractory three-dimensional structure into the slurry, pulling up the structure to remove excess slurry, drying and calcinating (the step of drying and calcinating may be done repeatedly) to be coated with the hydrocarbon adsorption components. As for conditions such as temperature and time of the drying and calcinations, temperature and time commonly used are used. For example, drying is carried out at a temperature of preferably 30 to 120° C., more preferably 40 to 80° C., and for a time period of preferably 0.2 to 3 hours, more preferably 0.5 to 2 hours. Calcination is carried out at a temperature of preferably 300 to 600° C., more preferably 350 to 500° C., and for a time period of preferably 0.2 to 3 hours, more preferably 0.5 to 2 hours.

Also, the A Type and the B Type can be coated separately (the B Type is coated after the A Type is coated, or the A Type is coated after the B Type is coated).

(Catalyst for Exhaust Gas Purification)

Second aspect of the present invention is a catalyst for exhaust gas purification using an adsorbent for hydrocarbons and a catalyst containing a catalytically active component in combination; first embodiment is a catalyst for exhaust gas purification characterized by making the A Type and the B Type to be present on a refractory three-dimensional structure (hereinafter, referred to as "lower adsorbent layer") and further a catalytically active component for exhaust gas purification to be present on the lower adsorbent layer (hereinafter, referred to as "upper catalyst layer"); and second embodiment is a catalyst for exhaust gas purification characterized by making a catalyst component for exhaust gas purification to be present on a refractory three-dimensional structure (hereinafter, referred to as "lower catalyst layer") and further the A Type and the B Type to be present on the lower catalyst layer (hereinafter, referred to as "upper adsorbent layer").

Alternatively, the adsorbent for hydrocarbons and the catalyst for exhaust gas purification may be mixed.

The catalytically active component for exhaust gas purification includes platinum, rhodium, palladium, and mixtures thereof. Among them, rhodium, palladium and a mixture thereof are preferable in view of activity.

Starting materials of the catalytically active component include salts of platinum and the like such as chlorides (halide salts), nitrate salts, sulfate salts, ammonium salts, amine salts, carbonate salts, bicarbonate salts, nitrite salts, oxalate salts, formate salts; hydroxides; alkoxides; oxides; and the like, and preferably nitrate salts, ammonium salts, amines and carbonate salts. Specifically, starting materials of platinum include inorganic compounds such as platinum nitrate, dinitroammine platinum, and the like; and organic compounds such as bis platinum and the like. Starting materials of rhodium include rhodium nitrate, rhodium acetate, and the like. Also, starting materials of palladium include palladium nitrate, and the like.

The catalyst layer generally functions as a three way catalyst or an oxidation catalyst, preferably as a three way catalyst. Therefore, the catalyst layer may contain a component other than the catalytically active components commonly used in a three way catalyst or an oxidation catalyst. The catalytically active components are preferably supported on an inert refractory inorganic oxide such as activated alumina, silica, zirconia, titania, or a complex oxide thereof.

When the catalyst layer is coated as a three way catalyst, platinum, rhodium, palladium, and mixtures thereof are included as catalytically active component(s), and preferably platinum and rhodium/palladium and rhodium/or platinum rhodium and palladium, more preferably palladium and rhodium are used. The catalytically active components are usually supported on a refractory inorganic oxide. The refractory inorganic oxide includes oxides having a large surface area such as activated alumina, silica, zirconia, titania, ceria, and the like, or complex oxides thereof and the like. Among them, activated alumina, zirconia and ceria are preferable, and activated alumina is particularly preferable. In addition, the refractory inorganic oxide may contain other additive components, the additive components include rare earth metals such as scandium (Sc), yttrium (Y), lanthanum (La), cerium (Ce), praseodymium (Pr), neodymium (Nd), and the like; metals such as zirconium (Zr), iron (Fe), cobalt (Co), nickel (Ni), and the like; oxides of the above metals; complex oxides of the above metals; and the like. Among them, oxides of Zr, Ce, La, Y, Nd and Pr; or complex oxides thereof are preferable, and oxides of Zr, Ce and La; or complex oxides thereof are more preferable.

From the viewpoint of purification performance, the catalytically active component(s) are present in an amount of preferably 0.1 to 15 g, and more preferably 1 to 8 g per 1 liter of refractory three-dimensional structure. In addition, the refractory inorganic oxide is present in an amount of preferably 10 to 300 g per 1 liter of refractory three-dimensional structure because of good dispersing ability of the catalytically active component and the like and less risk to cause clogging of honeycomb when the refractory inorganic oxide is supported on a carrier such as honeycomb and the like. Further, ceria ($CeO_2$) is present in an amount of preferably 5 to 150 g/liter per 1 liter of catalyst for exhaust gas purification, because of good oxygen storage and discharge effect. Also, an oxide of rare earth element other than cerium is added to improve thermal stability of the refractory inorganic oxide. When the oxide other than cerium is added in an amount over 50 g/liter per 1 liter of refractory three-dimensional structure, supporting strength of the catalytically active component is lowered because a certain amount of ceria has been supported in the three way catalyst. Consequently, addition of the rare earth element(s) is preferably in an amount of 50 g/liter or less per 1 liter of catalyst.

In addition, when the catalyst layer is coated as an oxidation catalyst, precious metals such as platinum, palladium, rhodium, and the like and refractory inorganic oxides, in particular, alumina, silica, zirconia, titania, or a complex oxide thereof can be used. Preferably, the catalyst layer contains a precious metal (a catalyst component) which is platinum and/or palladium and a refractory inorganic oxide of alumina, titania, silica, zirconia, or a complex oxide thereof. Further, one or two more kinds of rare earth metal oxides such as lanthanum oxide ($La_2O_3$) and the like, and metals such as cobalt, nickel, and the like are optionally added thereto.

From the viewpoint of purification performance, the catalytically active component(s) are present in an amount of preferably 0.1 to 15 g, and more preferably 1 to 8 g per 1 liter of refractory three-dimensional structure. In addition, the refractory inorganic oxide is present in an amount of preferably 10 to 300 g per 1 liter of refractory three-dimensional structure because of good dispersing ability of the catalyst component and the like and less risk to cause clogging of honeycomb when the refractory inorganic oxide is supported on a carrier such as honeycomb and the like. Further, when an oxide of the rare earth element is added, the amount is preferably over 0 and 150 g/liter or less per 1 liter of refractory three-dimensional structure. The oxide of the rare earth element is added to improve thermal stability of the refractory inorganic oxide, but addition of the oxide in an amount over 150 g/liter is not preferable, because supporting strength for the catalyst component is lowered.

Amount ratio of the adsorbent layer for hydrocarbons and the catalyst layer for exhaust gas purification is generally 5:1 to 1:1 (mass ratio), and preferably 2:1 to 1:1 (mass ratio).

Between the adsorbent for hydrocarbons layer and the catalyst for exhaust gas purification layer, an intermediate layer may be provided. As an intermediate layer, a refractory inorganic oxide, in particular, alumina, silica, zirconia, titania, or a complex oxide thereof can be used, and alumina and zirconia are preferably used.

The intermediate layer is used for delaying desorption of absorbed hydrocarbons.

Amount ratio of the adsorbent layer for hydrocarbons and the intermediate layer is generally 10:1 to 1:1 (mass ratio), and preferably 5:1 to 2:1 (mass ratio).

Third embodiment of the second aspect of the present invention is a catalyst for exhaust gas purification comprising of mixing a catalyst containing the catalytically active component for exhaust gas purification (for example, the above-described three way catalyst and oxidation catalyst) and the above-described adsorbent. Amount ratio of the adsorbent for hydrocarbons and the catalyst containing the catalytically active component for exhaust gas purification is generally 5:1 to 1:1 (mass ratio), and preferably 2:1 to 1:1 (mass ratio).

Next, the above-described first embodiment, that is, a method for preparing the catalyst for exhaust gas purification characterized by making the A Type and the B Type to be present on a refractory three-dimensional structure ("lower adsorbent layer") and further a catalytically active component for exhaust gas purification to be present on the layer ("upper catalyst layer"), will be described below.

Firstly, as described in the section of the above adsorbent, the A Type and the B Type are mixed in an aqueous medium to prepare a slurry, further a refractory three-dimensional structure is put into the aforementioned slurry, pulled up to remove excess slurry, dried, and calcinated. Further, a starting material of the catalytically active component and refractory inorganic oxide powder are subjected to wet milling to prepare an aqueous slurry. Then, a catalyst for exhaust gas purification can be obtained by putting the refractory three-dimensional structure coated with the zeolite into the aqueous slurry, pulling up the structure to remove excess slurry, drying generally at 100 to 200° C. for 0.2 to 1 hour, and calcinating, if necessary, generally at 350 to 600° C. for 0.5 to 2 hours (lower adsorbent layer/upper catalyst layer type).

In addition, the above-described second embodiment, that is, a method for preparing the catalyst for exhaust gas purification characterized by making a catalyst component for exhaust gas purification to be present on a refractory three-dimensional structure ("lower catalyst layer") and further the A Type and the B Type to be present on the lower catalyst layer ("upper adsorbent layer"), will be described below.

A starting material of the catalytically active component and refractory inorganic oxide powder are subjected to wet milling to prepare an aqueous slurry. Then, a refractory three-dimensional structure can be coated with the catalytically active component for exhaust gas purification, by putting the refractory three-dimensional structure into the aqueous slurry, pulling up the structure to remove excess slurry, drying generally at 100 to 200° C. for 0.2 to 1 hour, and calcinating, if necessary, generally at 350 to 600° C. for 0.5 to 2 hours. Subsequently, as described in the section of the above adsorbent, the A Type and the B Type are mixed in an aqueous medium to prepare a slurry, further, the refractory three-dimensional structure can be coated with the hydrocarbon adsorbing component, by putting the refractory three-dimensional structure into the slurry, removing excess slurry, drying, and calcinating, if necessary.

(Exhaust Gas Purification System)

Third aspect of the present invention relates to an exhaust gas purification system using the above-described adsorbent for hydrocarbons or the catalyst for exhaust gas purification.

By using the catalyst for exhaust gas purification, exhaust gas from an internal combustion such as diesel engine, gasoline engine, and the like can be purified. In particular, it is effective for removing HC in exhaust gas of gasoline engine in the initiation at low temperature.

Namely, in one embodiment of the exhaust gas purification system of the present invention, exhaust gas purification is carried out by installing any one of the above-described catalysts for exhaust gas purification in exhaust gas.

Also, in another embodiment of exhaust gas purification system of the present invention, exhaust gas purification is carried out by installing any one of the above-described adsorbent for hydrocarbons in the upstream side of exhaust gas, and a three way catalyst or an oxidation catalyst in the downstream side of exhaust gas.

Further, in another embodiment of exhaust gas purification system of the present invention, exhaust gas purification is carried out by installing a three way catalyst or an oxidation catalyst in the upstream side of exhaust gas, and any one of the above-described adsorbent for hydrocarbons in the downstream side of exhaust gas.

The above-described three way catalyst and oxidation catalyst can be used in such a manner that the catalytically active component(s) preferably supported on an inert inorganic oxide as mentioned in the section of the above catalyst layer are further supported on a refractory three-dimensional structure such as honeycomb, metal honeycomb, plug honeycomb and metal mesh. As for configuration of the honeycomb, generally, preferably opening is 300 to 600 cells per 1 square inch of cross-section and thickness of rib is 3 to 6 mm, and in the case of plug honeycomb, opening is 300 to 400 cells per 1 square inch of cross-section and pore diameter of rib is 10 to 30 μm.

By employing such a system, exhaust gas can be purified efficiently.

Fourth aspect of the present invention relates to a method for exhaust gas purification using the above-described adsorbent for hydrocarbons or catalyst for exhaust gas purification. By employing such a method, exhaust gas can be purified efficiently.

EXAMPLES

Hereinafter, the present invention will be explained in detail referring to Examples. However, the present invention is not limited by these Examples in any way.

Example 1

β-zeolite powder having SAR (molar ratio)=40 (2,000 g), β-zeolite powder having SAR (molar ratio)=500 (2,000 g), commercially available alumina sol (solid content reduced to alumina: 30%) (1000 g), and pure water (2,800 g) were subjected to wet milling in a ball mill to obtain an aqueous zeolite slurry.

Activated alumina (800 g), palladium nitrate (30 g as palladium), a complex oxide of ceria and zirconia containing lanthanum oxide (La:Ce:Zr=10:30:60 in mass ratio of oxide) (200 g), and an aqueous solution of rhodium nitrate (5 g as rhodium) was subjected to wet milling in a ball mill to obtain an aqueous Pd/Rh-containing slurry.

A monolithic carrier (1.0 liter) made of corgelite having 400 cells per 1 square inch of cross-section was dipped into the zeolite slurry. After taking out from the slurry, and blowing off excess slurry in the cells with compressed air, a step of drying at 150° C. for 20 minutes then calcinating at 500° C. for 1 hour was repeated 3 times to obtain a precursor catalyst with coated zeolite amount of 200 g/liter. Subsequently, the precursor catalyst was dipped into the Pd/Rh-containing slurry. After taking out from the slurry, and blowing off excess slurry in the cells with compressed air, the precursor catalyst was dried at 150° C. for 20 minutes then calcinated at 500° C. for 1 hour to obtain Catalyst A.

Supporting amounts of each component in the resultant catalyst per 1 liter of the carrier were: in the upper catalyst layer, Pd=3 g, Rh=0.5 g, $Al_2O_3$=87.5 g, $La_2O_3$=2 g, $CeO_2$=6 g and $ZrO_2$=12 g, and in the lower adsorbent layer, β-zeolite=200 g. Here, in the β-zeolite (200 g), mass ratio of "A Type" and "B Type" was 1:1.

Example 2

The same procedures were repeated as in Example 1 except that the β-zeolite powder having SAR (molar ratio)=500 was changed to β-zeolite powder having SAR (molar ratio)=300, to obtain Catalyst B. Here, in the β-zeolite (200 g) in the lower adsorbent layer, mass ratio of "A Type" and "B Type" was 1:1.

Example 3

The same procedures were repeated as in Example 1 except that the β-zeolite powder having SAR (molar ratio)=40 was changed to β-zeolite powder having SAR (molar ratio)=25, to obtain Catalyst C. Here, in the β-zeolite (200 g) in the lower adsorbent layer, mass ratio of "A Type" and "B Type" was 1:1.

Example 4

The same procedures were repeated as in Example 2 except that the amount of the β-zeolite powder having SAR (molar ratio)=40 was changed to 3,000 g and the amount of the β-zeolite powder having SAR (molar ratio)=300 was changed to 1,000 g, to obtain Catalyst H. Here, in the β-zeolite (200 g) in the lower adsorbent layer, mass ratio of "A Type" and "B Type" was 3:1.

Example 5

The same procedures were repeated as in Example 2 except that the amount of the β-zeolite powder having SAR (molar ratio)=40 was changed to 1,000 g and the amount of the β-zeolite powder having SAR (molar ratio)=300 was changed to 3,000 g, to obtain Catalyst I. Here, in the β-zeolite (200 g) in the lower adsorbent layer, mass ratio of "A Type" and "B Type" was 1:3.

Comparative Example 1

β-zeolite powder having SAR (molar ratio)=40 (4,000 g), commercially available alumina sol (solid content reduced to alumina: 30%) (1,000 g), and pure water (3,300 g) were subjected to wet milling in a ball mill to obtain an aqueous zeolite slurry. A monolithic carrier made of corgelite having 400 cells per 1 square inch of cross-section (1.0 liter) was dipped into the zeolite slurry. After taking out from the slurry, and blowing off excess slurry in the cells with compressed air, a step of drying at 150° C. for 20 minutes then calcinating at 500° C. for 1 hour was repeated 4 times to obtain a precursor catalyst with coated zeolite amount of 200 g/liter. Thereafter, the same procedures were repeated as in Example 1, to obtain Catalyst D. Here, in the β-zeolite (200 g) in the lower adsorbent layer, mass ratio of "A Type" and "B Type" was 1:0.

Comparative Example 2

β-zeolite powder having SAR (molar ratio)=500 (4,000 g), commercially available alumina sol (solid content reduced to alumina: 30%) (1,000 g), and pure water (2,500 g) were subjected to wet milling in a ball mill to obtain an aqueous zeolite slurry. Thereafter, the same procedures were repeated as in Example 1, to obtain Catalyst E. Here, in the β-zeolite (200 g) in the lower adsorbent layer, mass ratio of "A Type" and "B Type" was 0:1.

Comparative Example 3

β-zeolite powder having SAR (molar ratio)=300 (4,000 g), commercially available alumina sol (solid content reduced to alumina: 30%) (1,000 g), and pure water (2,600 g) were subjected to wet milling in a ball mill to obtain an aqueous zeolite slurry. Thereafter, the same procedures were repeated as in Example 1, to obtain Catalyst F. Here, in the β-zeolite (200 g) in the lower adsorbent layer, mass ratio of "A Type" and "B Type" was 0:1.

Comparative Example 4

β-zeolite powder having SAR (molar ratio)=25 (4,000 g), commercially available alumina sol (solid content reduced to alumina: 30%) (1,000 g), and pure water (3,500 g) were subjected to wet milling in a ball mill to obtain an aqueous zeolite slurry. A monolithic carrier made of corgelite having 400 cells per 1 square inch of cross-section (1.0 liter) was dipped into the zeolite slurry. After taking out from the slurry, and blowing off excess slurry in the cells with compressed air, a step of drying at 150° C. for 20 minutes then calcinating at 500° C. for 1 hour was repeated 4 times to obtain a precursor catalyst with coated zeolite amount of 200 g/liter. Thereafter, the same procedures were repeated as in Example 1, to obtain Catalyst G. Here, in the β-zeolite (200 g) in the lower adsorbent layer, mass ratio of "A Type" and "B Type" was 1:0.

(Measurement of HC Adsorption Effect)

For the Catalysts A to G, endurance tests were carried out using a commercially available electronically controlled engine (6 cylinders, 3,000 cc), with a converter filled with each of the catalysts being articulated to the exhaust system of the engine.

The engine was operated in a mode composed of steady operation for 20 seconds and reduction of speed for 6 seconds (during the reduction of speed, fuel is cut and catalyst is exposed to severe condition at a high temperature in an oxidative atmosphere). The endurance test was conducted for 40 hours under such a condition that top temperature of the catalyst section is 900° C.

Performances of the catalysts after the endurance test were evaluated using a commercially available electronically controlled engine (4 cylinders, 2,400 cc), with a converter filled with each of the catalysts and being articulated to the exhaust system of the engine.

HC adsorption/desorption effect was evaluated as follows. Purification rate for THC was determined by analyzing gas composition at the exit where temperature of the exhaust gas at the entrance of catalyst was continuously varied at the temperature rising speed of 150° C./minute, using an engine exhaust system having a heat exchanger in front of the catalyst converter, under the conditions of A/F (Air/Fuel ratio)=14.6±0.5 and 1 Hz. The results are shown in Table 2. In Table 2, adsorption effect of each catalyst is shown, with the proviso that HC adsorption rate of the Catalyst D is 100.

(SA Reduction Rate)

For Catalysts A to G, specific surface was measured after the endurance test under the conditions in the atmosphere of (water 10%+Air) at 950° C. for 10 hours. The results are shown in Table 2. Specific surface was measured using the BET method, and SA reduction rate was determined from the specific surfaces before and after the experiment. Less reduction rate means higher thermal stability.

[Table 1]

TABLE 1 a: Lower layer

| | Adsorbent for hydrocarbons layer (Lower layer) | | |
| --- | --- | --- | --- |
| | β-zeolite A Type | β-zeolite B Type | Al₂O₃ |
| Example 1 | 100 | 100 | 15 |
| Example 2 | 100 | 100 | 15 |
| Example 3 | 100 | 100 | 15 |
| Example 4 | 150 | 50 | 15 |
| Example 5 | 50 | 150 | 15 |
| Comparative Example 1 | 200 | 0 | 15 |
| Comparative Example 2 | 0 | 200 | 15 |
| Comparative Example 3 | 0 | 200 | 15 |
| Comparative Example 4 | 200 | 0 | 15 | b: Upper layer

| | Catalyst for Exhaust Gas Purification Layer (Upper layer)* | | | |
| --- | --- | --- | --- | --- |
| | Precious Metal | Al₂O₃ | La₂O₃ | CeO₂ | ZrO₂ |
| Example 1 | Pd = 3.0, Rh = 0.5 | 87.5 | 2 | 6 | 12 |
| Example 2 | Pd = 3.0, Rh = 0.5 | 87.5 | 2 | 6 | 12 |
| Example 3 | Pd = 3.0, Rh = 0.5 | 87.5 | 2 | 6 | 12 |
| Example 4 | Pd = 3.0, Rh = 0.5 | 87.5 | 2 | 6 | 12 |
| Example 5 | Pd = 3.0, Rh = 0.5 | 87.5 | 2 | 6 | 12 |
| Comparative Example 1 | Pd = 3.0, Rh = 0.5 | 87.5 | 2 | 6 | 12 |
| Comparative Example 2 | Pd = 3.0, Rh = 0.5 | 87.5 | 2 | 6 | 12 |
| Comparative Example 3 | Pd = 3.0, Rh = 0.5 | 87.5 | 2 | 6 | 12 |
| Comparative Example 4 | Pd = 3.0, Rh = 0.5 | 87.5 | 2 | 6 | 12 |

*Every cell represents supporting amount (g) per 1 liter of the carrier.

TABLE 2

| | | Zeolite | SAR | SA Reduction rate | HC Adsorbing Effect |
|---|---|---|---|---|---|
| Example 1 | Catalyst A | β-zeolite(1) + β-zeolite(2) | 40 + 500 | 46 | 109 |
| Example 2 | Catalyst B | β-zeolite(1) + β-zeolite(3) | 40 + 300 | 48 | 129 |
| Example 3 | Catalyst C | β-zeolite(4) + β-zeolite(2) | 25 + 500 | 51 | 112 |
| Example 4 | Catalyst H | β-zeolite(1) + β-zeolite(3) | 40 + 300 | 55 | 131 |
| Example 5 | Catalyst I | β-zeolite(1) + β-zeolite(3) | 40 + 300 | 43 | 122 |
| Comparative Example 1 | Catalyst D | β-zeolite(1) | 40 | 73 | 100 |
| Comparative Example 2 | Catalyst E | β-zeolite(2) | 500 | 38 | 29 |
| Comparative Example 3 | Catalyst F | β-zeolite(3) | 300 | 42 | 37 |
| Comparative Example 4 | Catalyst G | β-zeolite(4) | 25 | 80 | 96 |

From Table 2, it is clear that reduction rate of specific area when the A Type and the B Type are used in combination is lower compared with that when the A Type or the B Type is used alone. Namely, it can be understood that a higher thermal stability can be obtained by a synergistic effect.

Further, the same thing can be said for HC adsorption effect, that is, the adsorbent according to the present invention is superior in hydrocarbon adsorbing property, and has a lower reduction rate of specific area (SA).

The invention claimed is:

1. An adsorbent for hydrocarbons, comprising A Type of β-zeolite having a $SiO_2/Al_2O_3$ ratio (molar ratio) in a range of from 25 to 40 and B Type of β-zeolite having a $SiO_2/Al_2O_3$ ratio (molar ratio) in a range from 300 to 500.

2. The adsorbent for hydrocarbons according to claim 1, wherein the A Type and the B Type are mixed.

3. The adsorbent for hydrocarbons according to claim 1, wherein the A Type and the B Type are separately present.

4. The adsorbent for hydrocarbons according to claim 1, wherein mass ratio of the A Type to the B Type (A:B) is 1:10 to 10:1.

5. The adsorbent for hydrocarbons according to claim 1, further comprising other metal oxide selected from the group consisting of alumina, silica, zirconia, titania, ceria, and complex oxides thereof.

6. The adsorbent for hydrocarbons according to claim 5, wherein mass ratio of the total mass of the A Type and the B Type to the other metal oxide [(A+B): metal oxide] is 40:1 to 4:1.

7. The adsorbent for hydrocarbons according to claim 5, wherein mass ratio of the A Type to the other metal oxide (A:metal oxide) is 20:1 to 2:1, and mass ratio of the B Type to the other metal oxide (B:metal oxide) is 20:1 to 2:1.

8. The adsorbent for hydrocarbons according to claim 1, wherein the A Type and the B Type are supported on a refractory three-dimensional structure.

9. The adsorbent for hydrocarbons according to claim 8, wherein the A Type and the B Type are mixed.

10. The adsorbent for hydrocarbons according to claim 8, wherein mass ratio of the A Type to the B Type (A:B) is 1:10 to 10:1.

11. The adsorbent for hydrocarbons according to claim 8, further comprising other metal oxide selected from the group consisting of alumina, silica, zirconia, titania, ceria, and complex oxides thereof.

12. The adsorbent for hydrocarbons according to claim 8, wherein mass ratio of the A Type to the other metal oxide (A:metal oxide) is 20:1 to 2:1, and mass ratio of the B Type to the other metal oxide (B:metal oxide) is 20:1 to 2:1.

13. A catalyst for exhaust gas purification, comprising a lower adsorbent layer containing A Type of β-zeolite having a $SiO_2/Al_2O_3$ ratio (molar ratio) in a range from 25 to 40 and B Type of β-zeolite having a $SiO_2/Al_2O_3$ ratio (molar ratio) in a range from 300 to 500 present on a refractory three-dimensional structure, and an upper catalyst layer containing a catalytically active component for exhaust gas purification selected from the group consisting of platinum, rhodium, palladium, and mixtures thereof present on the lower adsorbent layer.

14. The catalyst for exhaust gas purification according to claim 13, wherein the catalyst layer comprises an inert refractory inorganic oxide which supports a catalytically active component thereon.

15. The catalyst for exhaust gas purification according to claim 13, wherein mass ratio of the A Type to the B Type (A:B) is 1:10 to 10:1.

16. A catalyst for exhaust gas purification, comprising a lower catalyst layer containing a catalytically active component for exhaust gas purification selected from the group consisting of platinum, rhodium, palladium, and mixtures thereof present on a refractory three-dimensional structure, and an upper adsorbent layer containing A Type of β-zeolite having a $SiO_2/Al_2O_3$ ratio (molar ratio) in a range from 25 to 40 and B Type of β-zeolite having a $SiO_2/Al_2O_3$ ratio (molar ratio) in a range from 300 to 500 present on the lower catalyst layer.

17. The catalyst for exhaust gas purification according to claim 16, wherein the catalyst layer comprises an inert refractory inorganic oxide which supports a catalytically active component thereon.

18. The catalyst for exhaust gas purification according to claim 16, wherein mass ratio of the A Type to the B Type (A:B) is 1:10 to 10:1.

19. An exhaust gas purification system, installing the catalyst for exhaust gas purification according to claim 13 in exhaust gas.

20. An exhaust gas purification system, installing the catalyst for exhaust gas purification according to claim 16 in exhaust gas.

21. An exhaust gas purification system, installing the adsorbent for hydrocarbons according to claim 1 in the upstream side of exhaust gas, and installing a three way catalyst or an oxidation catalyst in the downstream side of exhaust gas.

22. An exhaust gas purification system, installing a three way catalyst or an oxidation catalyst in the upstream side of exhaust gas, and installing the adsorbent for hydrocarbons according to claim 1 in the downstream side of exhaust gas.

23. A method for exhaust gas purification, wherein exhaust gas is purified by the catalyst for exhaust gas purification according to claim 13.

24. A method for exhaust gas purification, wherein exhaust gas is purified by the catalyst for exhaust gas purification according to claim 16.

* * * * *